(12) United States Patent
Jewett et al.

(10) Patent No.: US 10,722,044 B2
(45) Date of Patent: Jul. 28, 2020

(54) DUAL-LAYERED FABRIC FOR USE IN POCKETED SPRING ASSEMBLY

(71) Applicant: L&P Property Management Company, South Gate, CA (US)

(72) Inventors: Jason Jewett, Carthage, MO (US); Darrell A. Richmond, Carthage, MO (US)

(73) Assignee: L&P Property Management Company, South Gate, CA (US)

( * ) Notice: Subject to any disclaimer, the term of this patent is extended or adjusted under 35 U.S.C. 154(b) by 125 days.

(21) Appl. No.: 16/003,809

(22) Filed: Jun. 8, 2018

(65) Prior Publication Data

US 2018/0368584 A1 Dec. 27, 2018

Related U.S. Application Data

(60) Provisional application No. 62/525,384, filed on Jun. 27, 2017.

(51) Int. Cl.
*A47C 27/07* (2006.01)
*A47C 27/06* (2006.01)
(Continued)

(52) U.S. Cl.
CPC ............ *A47C 27/064* (2013.01); *A47C 7/347* (2013.01); *A47C 7/35* (2013.01); *A47C 27/05* (2013.01); *B29C 65/08* (2013.01); *B29C 66/1122* (2013.01); *B29C 66/133* (2013.01); *B29C 66/43* (2013.01); *B29C 66/71* (2013.01); *B29C 66/7294* (2013.01); *B29C 66/836* (2013.01); *B29C 66/8432* (2013.01); *B32B 5/022* (2013.01); *B32B 5/26* (2013.01); *B32B 37/0084* (2013.01); *B32B 37/06* (2013.01); *B32B 37/203* (2013.01); *B68G 7/05* (2013.01); *D01F 6/06* (2013.01); *D04H 3/007* (2013.01); *D04H 3/14* (2013.01); *D04H 3/16* (2013.01); *B29K 2023/12* (2013.01); *B29L 2031/58* (2013.01); *B29L 2031/751* (2013.01); *B32B 2250/20* (2013.01); *B32B 2262/0253* (2013.01);
(Continued)

(58) Field of Classification Search
CPC ........................................................ A47C 27/07
USPC ............................... 5/720, 716, 655.8, 654.1
See application file for complete search history.

(56) References Cited

U.S. PATENT DOCUMENTS 4,234,983 A * 11/1980 Stumpf ................ A47C 27/064
5/246
5,424,115 A 6/1995 Stokes
(Continued)

FOREIGN PATENT DOCUMENTS

KR 20130052335 5/2013

*Primary Examiner* — Fredrick C Conley
(74) *Attorney, Agent, or Firm* — Wood Herron & Evans LLP (57) ABSTRACT

A pocketed spring assembly comprises a plurality of parallel strings of individually pocketed springs. Each string is joined to at least one adjacent string. Each string has first and second opposed plies of fabric and a plurality of pockets formed along a length of the string by transverse seams joining the plies. At least one spring is positioned in each of the pockets. The double-layered fabric used to make at least some strings comprises two layers of non-woven spun-bonded polypropylene fabric to reduce noise. The layers may be ultrasonically welded or point bonded together.

30 Claims, 10 Drawing Sheets

(51) Int. Cl.

| | | |
|---|---|---|
| A47C 27/05 | (2006.01) | |
| A47C 7/35 | (2006.01) | |
| B68G 7/05 | (2006.01) | |
| D04H 3/16 | (2006.01) | |
| D01F 6/06 | (2006.01) | |
| D04H 3/007 | (2012.01) | |
| B29C 65/08 | (2006.01) | |
| B29C 65/00 | (2006.01) | |
| B32B 5/02 | (2006.01) | |
| B32B 5/26 | (2006.01) | |
| B32B 37/20 | (2006.01) | |
| B32B 37/06 | (2006.01) | |
| A47C 7/34 | (2006.01) | |
| D04H 3/14 | (2012.01) | |
| B32B 37/00 | (2006.01) | |
| B29L 31/58 | (2006.01) | |
| B29L 31/00 | (2006.01) | |
| B29K 23/00 | (2006.01) | |

(52) U.S. Cl.
CPC ..... *B32B 2305/20* (2013.01); *B32B 2310/028* (2013.01); *B32B 2323/10* (2013.01); *B32B 2601/00* (2013.01); *D10B 2321/022* (2013.01); *D10B 2505/08* (2013.01)

(56) References Cited

U.S. PATENT DOCUMENTS

| | | |
|---|---|---|
| 6,159,319 A | 12/2000 | Mossbeck |
| 8,136,187 B2 | 3/2012 | Mossbeck et al. |
| 8,464,381 B2 | 6/2013 | Mossbeck |
| 8,484,784 B2 | 7/2013 | Mossbeck |
| 10,034,553 B2 | 7/2018 | Long |
| 2004/0241399 A1 | 12/2004 | Marmon et al. |
| 2014/0201924 A1* | 7/2014 | Wolfson ............ A47C 27/07 5/720 |
| 2016/0235212 A1 | 8/2016 | Krtek et al. |
| 2016/0235213 A1 | 8/2016 | Long |

* cited by examiner

DUAL-LAYERED FABRIC FOR USE IN POCKETED SPRING ASSEMBLY

FIELD OF THE INVENTION

This invention relates generally to fabric for use in bedding and seating products and, more particularly, for use in pocketed spring assemblies used in bedding and seating products.

BACKGROUND OF THE INVENTION

Mattress spring core construction over the years has been a continuously improving art with advancements in materials and machine technology. A well-known form of spring core construction is known as a Marshall spring construction wherein metal coil springs are encapsulated in individual pockets of fabric and formed as elongate or continuous strings of pocketed coil springs. In an earlier form, these strings of coil springs were manufactured by folding an elongate piece of fabric in half lengthwise to form two plies of fabric and stitching transverse and longitudinal seams to join the plies of fabric to define pockets within which the springs were enveloped.

More recently, improvements in spring core constructions have involved the use of fabrics which are thermally or ultrasonically weldable to themselves. By using such welding techniques, these fabrics have been advantageously used to create strings of individually pocketed coil springs wherein transverse and longitudinal welds, instead of stitching, are used to form the pockets encapsulating the springs. A fabric which has been used and proven to ultrasonically weld to itself is a non-woven polypropylene fabric.

Due to its low cost, a single-layer of non-woven spun-bonded polypropylene fabric is the most common fabric used in the manufacture of strings of springs used in pocketed spring assemblies. The weight of such a single-layer of non-woven spun-bonded polypropylene fabric is commonly between 1-3 ounces per square yard. While single layer non-woven spun-bonded polypropylene fabric has been attractive to many pocketed spring core manufacturers because of its accessibility and low cost, such fabric has one drawback.

A pocketed spring assembly comprising strings of individually pocketed springs made from such single layer non-woven spun-bonded polypropylene fabric may create "noise", as known in the industry. Such noise may be created by the fabric expanding upon removal of the load due to the coil spring's upwardly directed force on the fabric. This noise may be described as a "rustling" of the fabric as the fabric rubs on adjacent metal coil springs or on other upholstery materials such as urethane foam, latex or fiber.

Noise, as it is known in the industry, may be reduced by reducing the weight of the single-layer non-woven spun-bonded polypropylene fabric. However, such lighter weight single-layer non-woven spun-bonded polypropylene fabric has proven to be insufficient for processing the fabric through a coiler and properly retaining the metal coil springs in their respective pockets.

It is therefore an objective of this invention to provide a pocketed spring assembly made, at least partially, with dual layer, non-woven spun-bonded polypropylene fabric which has adequate strength for processing the fabric during manufacture of strings of springs but results in reduced noise.

It is further an objective of this invention to provide a pocketed spring assembly made, at least partially, with dual layer, non-woven spun-bonded polypropylene fabric strong enough hold up during the manufacturing process but which reduces the noise when incorporated into the pocketed spring assembly.

It is therefore an objective of this invention to provide a dual or double-layer non-woven spun-bonded polypropylene fabric for a pocketed spring assembly which has adequate strength to withstand the process of being used in a pocket coiler, but which results in less noise than a conventional single-layer non-woven spun-bonded polypropylene fabric when incorporated into a pocketed spring assembly.

It is another objective of this invention to provide a method of making a double-layer non-woven spun-bonded polypropylene fabric for a pocketed spring assembly which ultrasonically welds to itself, has improved strength when compared to a single-layer non-woven spun-bonded polypropylene fabric, and is quiet.

SUMMARY OF THE INVENTION

According to one aspect of the present invention, a bedding or seating product incorporates a novel pocketed spring assembly. The pocketed spring assembly comprises a plurality of parallel strings of springs joined together. Each string is joined to at least one adjacent string. Each string comprises a plurality of aligned individually pocketed springs. Each string comprises a dual layer combination of fabric folded around multiple springs to create first and second opposed sides of fabric covering opposite surfaces of the springs. The dual layer combination of fabric is joined to itself along a longitudinal seam which may extend along one of the sides of the string of springs. Pockets are formed along the length of the string of springs by transverse or separating seams joining the first and second sides covering opposite surfaces of the springs, at least one spring being positioned in each pocket. The dual layer combination of fabric comprises only two layers of non-woven spunbonded polypropylene fabric.

The bedding or seating product may further comprise cushioning material and a covering encasing the pocketed spring assembly and cushioning materials.

In some embodiments, the fabric used to make at least one of the strings of springs comprises two identical layers of non-woven spunbonded polypropylene fabric joined together. In some embodiments, at least one non-woven fabric layer comprises spunbonded polypropylene fabric. However, any non-woven fabric may be used for either layer. In some embodiments, the layers of non-woven fabric are ultrasonically welded together. The ultrasonic welds may be located at various locations throughout the piece of fabric, the double-layered fabric being known in the industry as being point bonded.

In other embodiments, the welds may be made along the side edges of the fabric. Such edge welds may be continuous or intermittent. The edge welds of the double-layered non-woven spunbonded polypropylene fabric may be made in a separate apparatus prior to the double-layered non-woven spunbonded polypropylene fabric entering a coiler or machine producing coil springs and pocketing them to create a continuous string of individually pocketed springs. Alternatively, the two layers of non-woven spunbonded polypropylene fabric may be welded together in the machine. Thus, the linear seam bonding/welding may occur on a separate machine or in-line with a feed roller supplying non-woven spunbonded polypropylene fabric for the machine producing the coils and pocketing them. The in-line method is preferred due to lower cost. When using the in-line process, the double-layered non-woven spunbonded polypropylene fabric may be supplied from a pre-spooled roll. Alternatively, each layer of non-woven spunbonded polypropylene fabric may be pre-spooled on a roll and the layers brought together for in-line bonding/welding. The in-line bonding apparatus may comprise a weld horn and anvil to ultrasonically weld the layers of non-woven spunbonded polypropylene fabric together. Alternatively, wheel-type ultrasonic rollers may be used. Other known methods using heat may weld or bond the edges of the layers of non-woven spunbonded polypropylene fabric together prior to the continuous string of pocketing springs being manufactured. Once the two layers pass through the welding or bonding apparatus to join the two layers, the fabric travels into a coiler where the double-layered non-woven spunbonded polypropylene fabric is used to create either a continuous string of pocketing springs or strings of desired lengths.

Although the non-woven spunbonded polypropylene fabric comprises two layers of non-woven spunbonded polypropylene welded together, air may flow through the double-layered fabric. However, upon being subjected to a load and released, a pocketed spring assembly made with the double-layered non-woven spunbonded polypropylene welded together is quieter than pocketed spring assemblies made with single layer non-woven spunbonded polypropylene.

It is within the scope of the present invention that some of the seams be segmented. In other words, some of the seams or portions thereof may be solid seams without segments. In such a pocketed spring assembly, some of seams, or portions thereof, may be segmented. The strings of springs may extend longitudinally (head-to-foot) or transversely (side-to-side).

According to another aspect of the invention, a pocketed spring assembly for use in a bedding or seating product comprises a plurality of parallel strings of springs joined together. Each string is joined to at least one adjacent string. Each string comprises a plurality of aligned individually pocketed springs. Each string is formed from a set of aligned non-woven spunbonded polypropylene fabric pieces. The aligned set of fabric pieces is joined to itself along a longitudinal seam and has first and second opposed sides of fabric covering opposite surfaces of the springs. A plurality of pockets is formed along a length of the string by transverse seams joining the first and second sides of the fabric, at least one spring being positioned in each of the pockets. The longitudinal seam and each of the transverse seams joins four pieces plies or layers of non-woven spunbonded polypropylene fabric together.

According to another aspect of the invention, the double-layered fabric used to make a string of springs comprises a first layer of non-woven spunbonded polypropylene material and a second layer of non-woven spunbonded polypropylene material. The first and second layers are ultrasonically welded to each other to prevent noise when the pocketed spring assembly is compressed and expanded. The first and second layers may be point bonded or ultrasonically welded along opposed edges of the fabric, for example. When the double-layered non-woven spunbonded polypropylene fabric is wrapped around spaced springs and ultrasonically welded to itself along longitudinal and transverse seams to form a string, the double-layered non-woven spunbonded polypropylene fabric results in a quieter string than if a single-layer non-woven spunbonded polypropylene fabric having sufficient strength were used to create the string. The first and second layers of the double-layered non-woven spunbonded polypropylene fabric may be the same weight or may be different weights. In some embodiments, each of the layers of non-woven spunbonded polypropylene fabric has a weight of between 0.5 to 1.5 ounces per square yard.

According to another aspect, a method of making a double-layered non-woven spunbonded polypropylene fabric for use in a pocketed spring assembly is provided. The method comprises unrolling a web of double-layered non-woven spunbonded polypropylene fabric from a roll of double-layered fabric, each of the layers comprising non-woven spunbonded polypropylene fabric. The next step comprises passing the web of double-layered fabric through a welder to create a finished double-layered non-woven spunbonded polypropylene fabric. The welder may create continuous welds along edges of the web of finished double-layer non-woven spunbonded polypropylene fabric. The next step comprises creating a string of springs in a coiler with the finished double-layer non-woven spunbonded polypropylene fabric.

According to another aspect, a method of making a pocketed spring assembly for use in a bedding or seating product is provided. The method comprises creating a web of double-layered spunbonded polypropylene fabric from two rolls of single-layered spunbonded polypropylene fabric. The web of double-layered spunbonded polypropylene fabric is passed through a welding apparatus to create a finished double-layered spunbonded polypropylene fabric which is then used to create a string of springs in a coiler. The welding apparatus may be an independent apparatus upstream from a machine which creates a continuous string of individually pocketed springs. Alternatively, the welding apparatus may be incorporated into the machine. The welding apparatus may point bond the two layers together or weld them together along their side edges.

In yet another method, the welding apparatus may be omitted. In such a method, each of the two rolls of single-layered non-woven spunbonded polypropylene fabric rotates at the same speed so a dual-layered web of non-woven spunbonded polypropylene fabric enters a coiler to be made into a continuous string of springs.

According to another aspect, a comfort layer or blanket adapted to cover a spring core of a bedding or seating cushion product comprises a matrix of interconnected pocketed mini coil springs. Each mini coil spring is contained within a pocket of non-woven fabric between top and bottom plies. Each of the plies of non-woven fabric is permeable to airflow through the non-woven fabric ply. The non-woven plies are joined by seams around the pockets. At least one of the plies comprises double-layered non-woven fabric. Each layer of at least one of the plies may comprise non-woven spunbonded polypropylene fabric. The seams of the pockets may be circular or straight seams.

The accompanying drawings, which are incorporated in and constitute a part of this specification, illustrate embodiments of the invention and, together with the summary of the invention given above, and the detailed description of the drawings given below, explain the principles of the present invention.

DETAILED DESCRIPTION OF THE INVENTION

Figure 1:
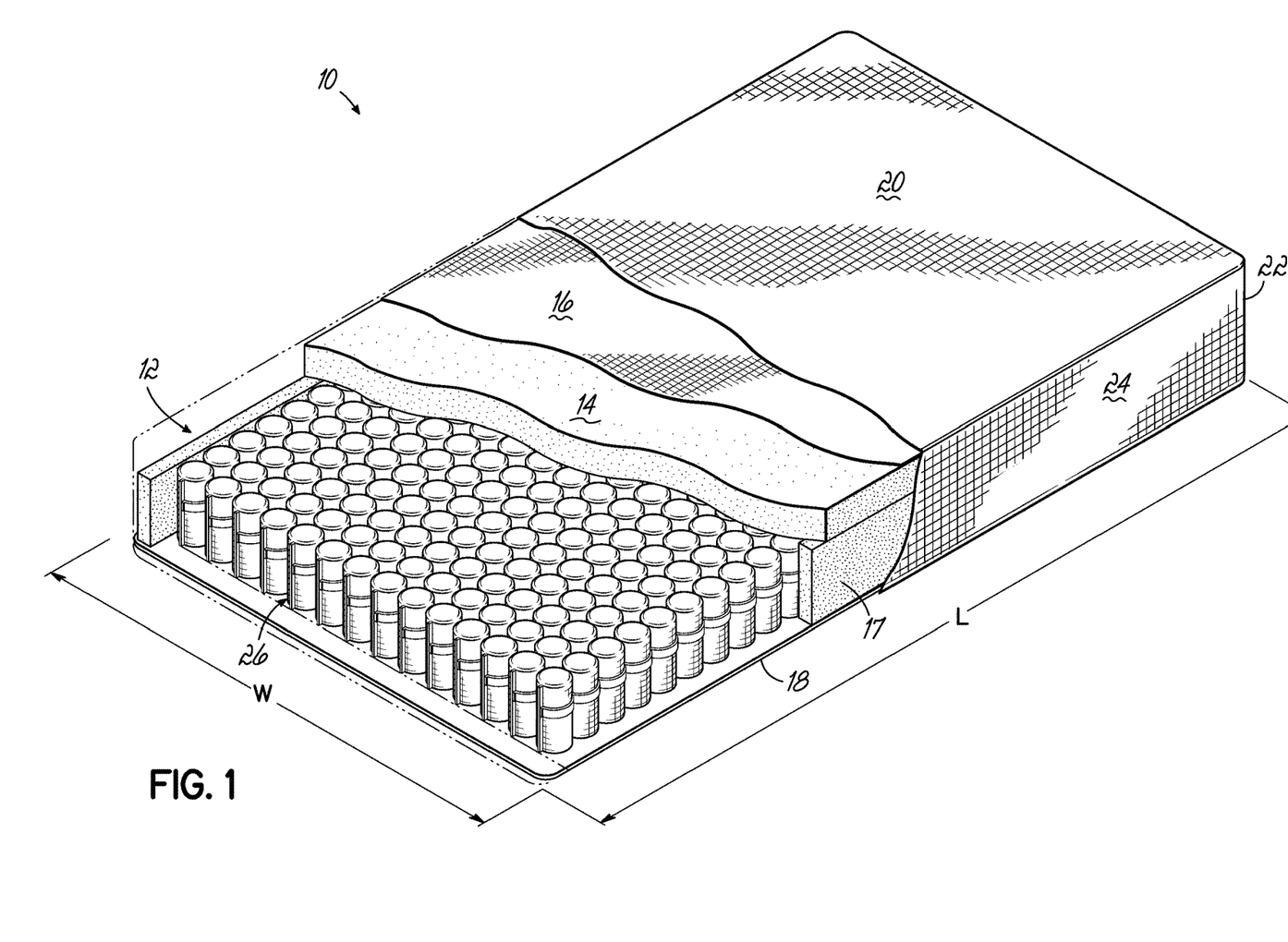
FIG. 1 is a perspective view, partially broken away, of a bedding or seating product incorporating a pocketed spring assembly made in accordance with the present invention.
Figure 1A:
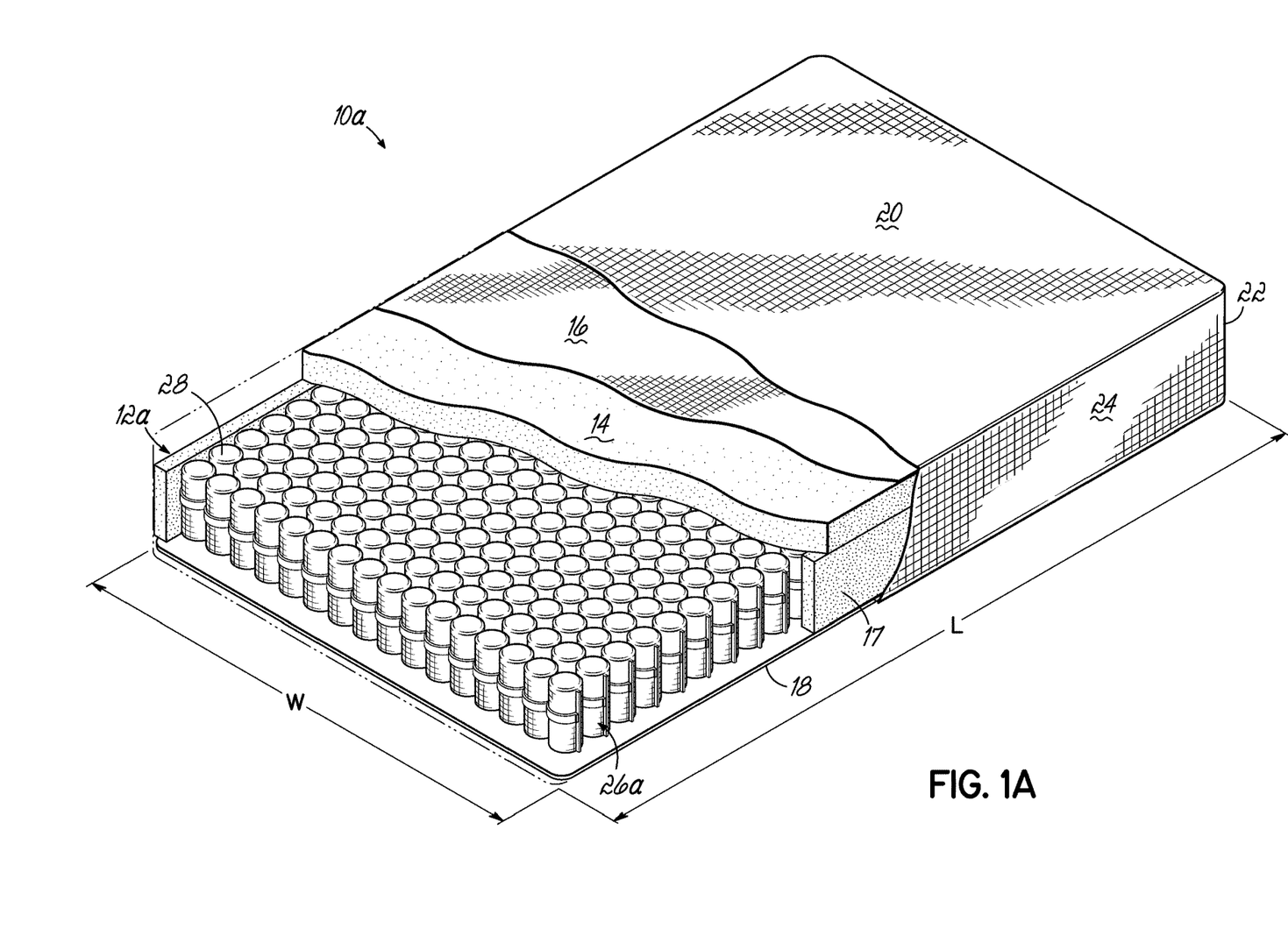
FIG. 1A is a perspective view, partially broken away, of a bedding or seating product incorporating another pocketed spring assembly.

Referring first to FIG. 1, there is illustrated a bedding product in the form of a single-sided mattress 10 incorporating the principles of the present invention. This product or mattress 10 comprises a pocketed spring assembly 12 over the top of which lays conventional padding or cushioning layers 14, 16 which may be foam, fiber, gel, a pocketed spring blanket, one or more scrim sheets or any other suitable materials or any combination thereof. The pocketed spring assembly 12 may be surrounded with a border 17 made of foam or any other suitable material (only a portion being shown in FIG. 1). Although one type of border 17 is illustrated in FIGS. 1, 1A, 1B and 1C, the border may assume other forms or shapes of any desired size, such as pocketed coil springs. In place of a foam border, it has become common to at least partially surround a pocketed spring assembly with springs of a different diameter, height, gauge wire or firmness than the pocketed springs of the interior of the pocketed spring assembly. In any product shown or described herein incorporating any embodiment of pocketed spring assembly shown or described herein, a border may be omitted.

Pocketed spring assembly 12 resides upon a base 18 and all components enclosed within an upholstered covering material 20. The base 18 and border 17 are known in the industry as a "bucket" into which a pocketed spring assembly 12 is inserted before the "bucket" is covered with one or more padding or cushioning layers. The base 18 may be foam, a scrim sheet, a substrate, plastic, wood or any other known material.

As shown in FIG. 1, fully assembled, the product 10 has a length "L" defined as the linear distance between opposed end surfaces 22 (only one being shown in FIG. 1). Similarly, the assembled product 10 has a width "W" defined as the linear distance between opposed side surfaces 24 (only one being shown in FIG. 1). In the product shown in FIG. 1, the length is illustrated as being greater than the width. However, it is within the scope of the present invention that the length and width may be identical, as in a square product.

Figure 1C:
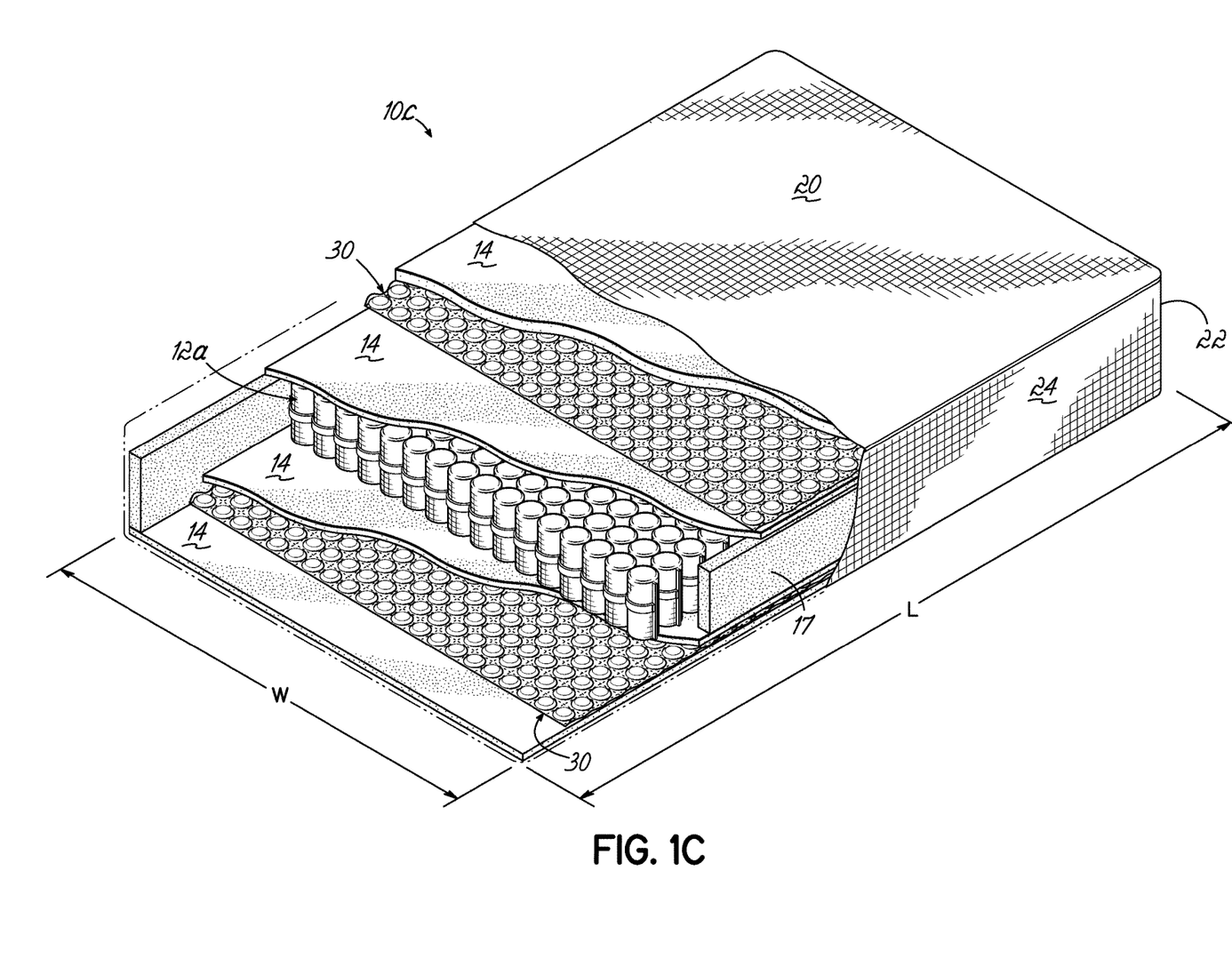
FIG. 1C is a perspective view, partially broken away, of two-sided bedding product incorporating the pocketed spring assembly of FIG. 1A.
Figure 2:
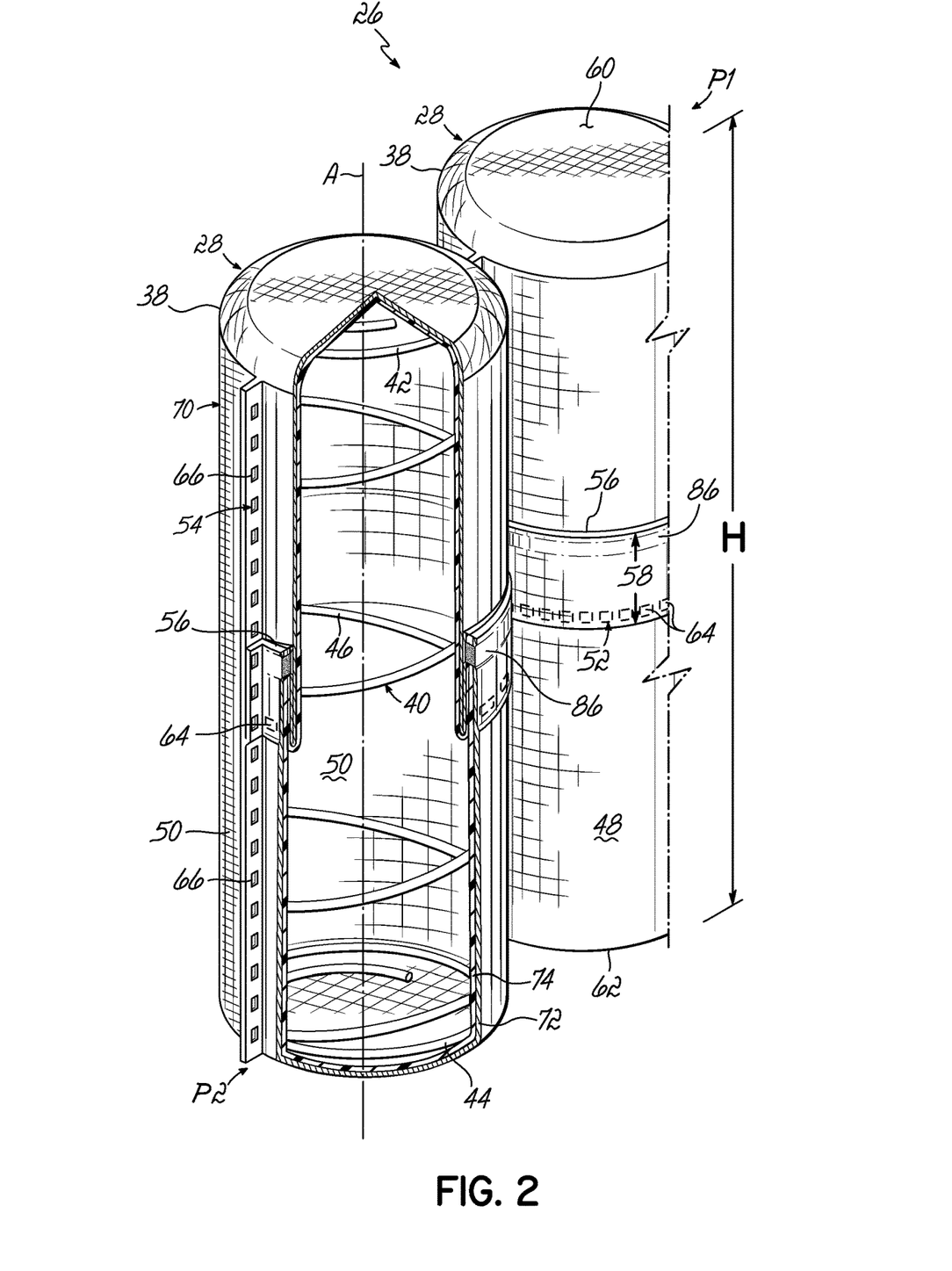
FIG. 2 is a perspective view, partially broken away, of a portion of one of the strings of springs of FIG. 1, in an unloaded condition.

As shown in FIGS. 1 and 2, pocketed spring assembly 12 is manufactured from multiple strings 26 of pocketed springs 28 joined together. In pocketed spring assembly 12 shown in FIG. 1, each string 26 of pocketed springs 28 extends longitudinally or from head-to-foot along the full length of the pocketed spring assembly 12. Although the strings 26 of pocketed springs 28 are illustrated as extending longitudinally or from head-to-foot in the pocketed spring assembly 12 of FIG. 1, the strings may extend transversely or from side-to-side as shown in a pocketed spring assembly 12a shown in the products 10a, 10c shown in FIGS. 1A and 1C, respectively. The pocketed spring assembly 12a comprises multiple strings 26a of pocketed springs 28, identical to the strings of springs 26, but shorter in length. In any of the embodiments shown or described herein, the strings may extend either longitudinally (from end-to-end) or transversely (from side-to-side).

Figure 1B:
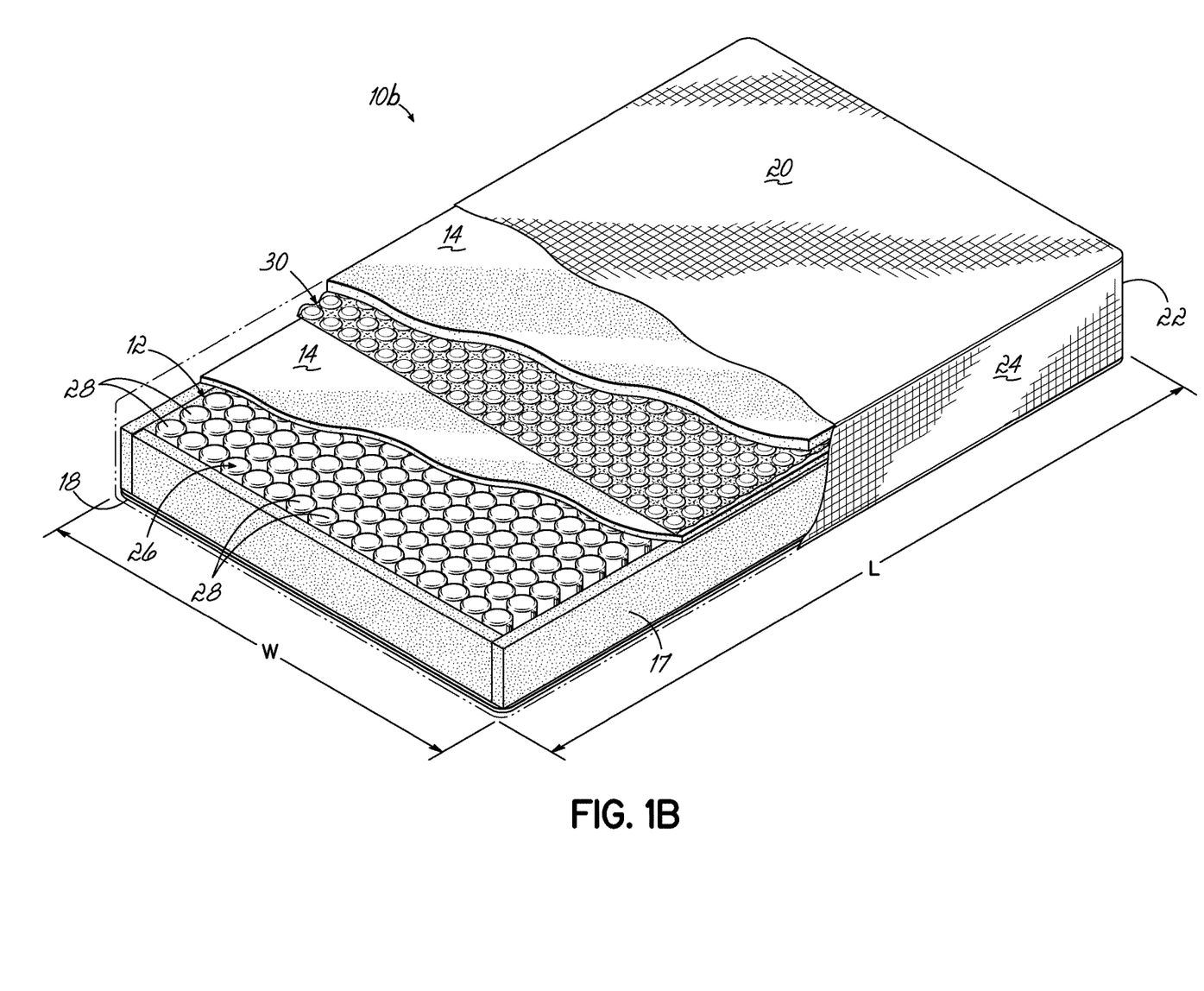
FIG. 1B is a perspective view, partially broken away, of another bedding product incorporating the pocketed spring assembly of FIG. 1A.

FIG. 1B illustrates a single-sided mattress 10b comprising a pocketed spring assembly 12 and border 17 identical to those shown in the mattress 10 of FIG. 1. However, the mattress 10b of FIG. 1B has a pocketed topper 30 employing miniature or small coil springs individually pocketed, in addition to padding layers 14 above and below the pocketed topper 30. Although one configuration of pocketed topper 30 is illustrated, any pocketed topper known in the art may be used.

FIG. 1C illustrates a double-sided mattress 10c comprising a pocketed spring assembly 12a and border 17. The mattress 10c of FIG. 1B has pocketed toppers 30 above and below the pocketed spring assembly 12a in addition to padding layers 14 above and below each pocketed topper 30. While the mattresses 10, 10a and 10b illustrated in FIGS. 1, 1A and 1B, respectively, are single-sided mattresses, any pocketed spring assembly shown or described herein may be incorporated into any bedding or seating product shown or described herein, including a double-sided mattress or seating cushion, such as the mattress 10c shown in FIG. 1C. If desired, any of the padding or cushioning layers, including one or more pocketed topper 30, may be omitted in any of the embodiments shown or described herein.

Strings of pocketed springs 26, 26a and any other strings of springs described or shown herein, may be connected in side-by-side relationship as, for example, by gluing the sides of the strings together in an assembly machine, to create an assembly or matrix of springs having multiple rows and columns of pocketed springs bound together as by gluing, welding or any other conventional assembly process commonly used to create pocketed spring cores or assemblies.

Figure 3A:
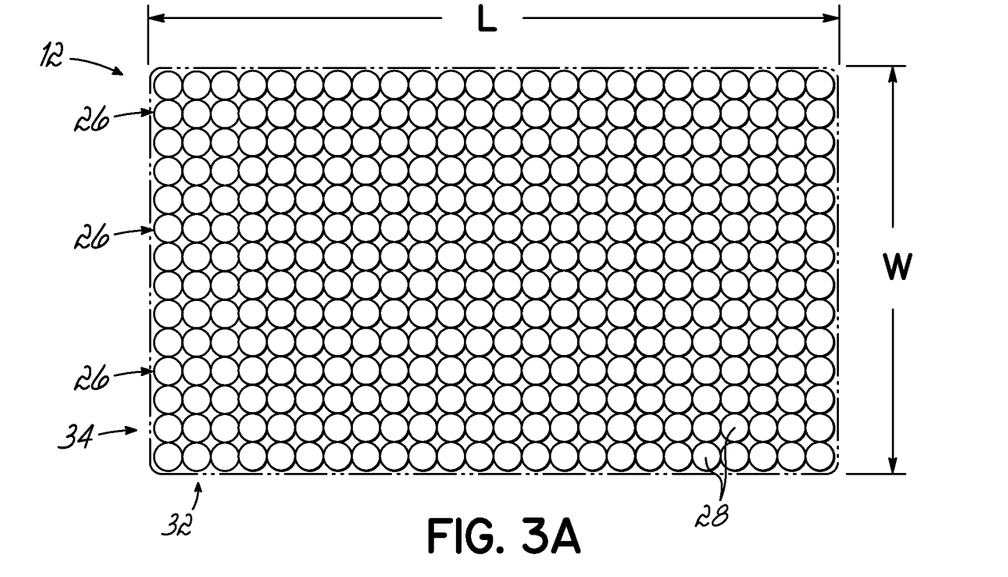
FIG. 3A is a top view of a pocketed spring assembly made in accordance with the present invention.

Referring to FIG. 3A, the longitudinally extending strings 26 of pocketed spring assembly 12, along with any other strings described or shown herein, including transversely extending strings 26a of pocketed spring assembly 12a, may be joined so that the individually pocketed springs 28 are aligned in transversely extending rows 32 (extending from side-to-side) and longitudinally extending columns 34 (extending from head-to-foot).

Figure 3B:
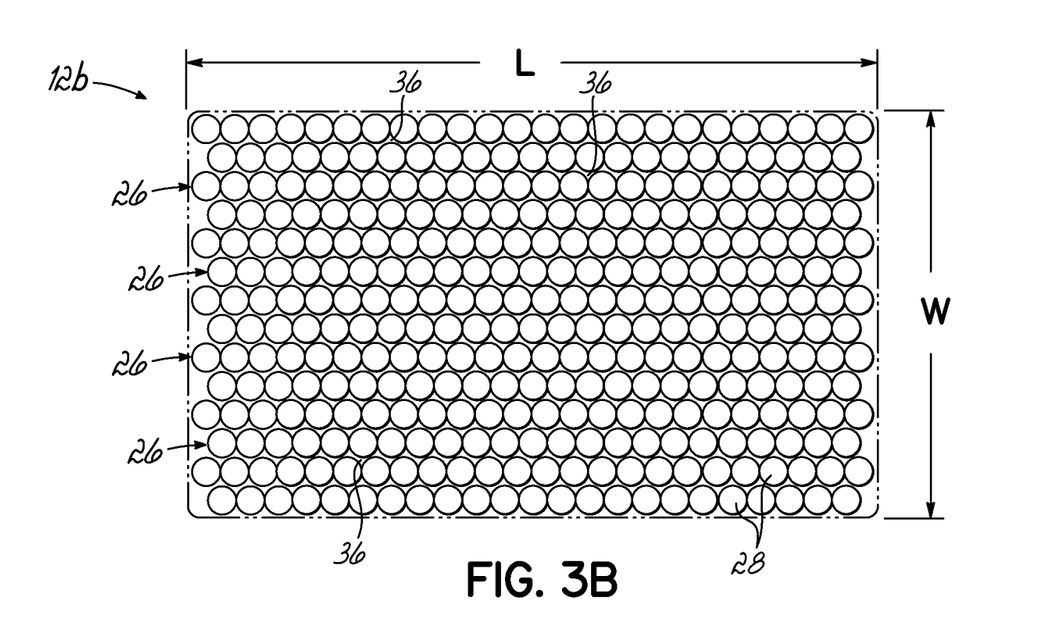
FIG. 3B is a top view of another pocketed spring assembly made in accordance with the present invention.

Alternatively, as shown in FIG. 3B, the longitudinally extending strings 26 of pocketed spring assembly 12b, along with any other strings described or shown herein, including transversely extending strings 26a of pocketed spring assembly 12a, may be offset from one another. In such an arrangement, shown in FIG. 3B, the individually pocketed springs 28 are not aligned in rows and columns; instead the individually pocketed springs 28 fill voids 36 of the adjacent strings. Either alignment of strings may be incorporated into any of the pocketed spring assemblies or cores illustrated or described herein.

FIG. 2 illustrates a perspective view of the portion of a string 26 of pocketed springs 28 in a relaxed condition under no external load. As best illustrated in FIG. 2, each string 26 of pocketed springs 28 comprises a row of interconnected fabric pockets 38. Each of the fabric pockets 38 contains at least one resilient member, such as a coil spring 40. The resilient member need not be a coil spring; it may be made of foam or other resilient material. The coil spring 40 is preferably made of one piece of wire of a uniform diameter, but may be made of other materials, multiple strands of twisted wire and/or may be a non-uniform diameter, such as a barrel-shaped spring.

Figure 2A:
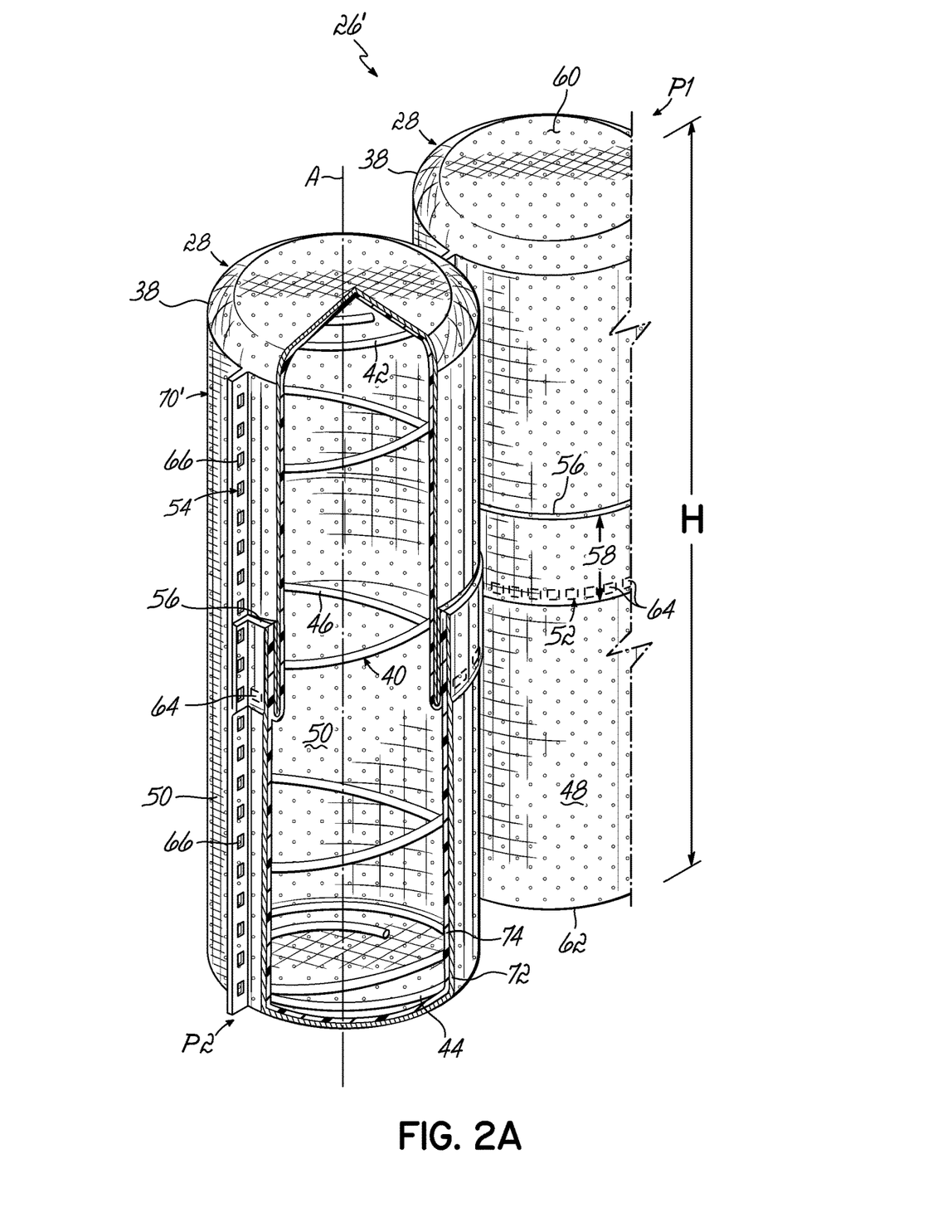
FIG. 2A is a perspective view, partially broken away, of a portion of another embodiment of string of springs in an unloaded condition.

As best shown in FIGS. 2 and 2A, each coil spring 40 has a central or longitudinal axis A, an upper end turn 42, a lower end turn 44 and a plurality of central convolutions 46 between the end turns. FIGS. 2 and 2A illustrate a coil spring 40 in which the diameter of the end turns 42, 44 is generally identical to the diameter of the central convolutions 46. However, any known coil spring may be used inside any the fabric pockets 38. Not all coil springs within a pocketed spring assembly need be identical. The pocketed spring assembly of the present invention may use pieces of foam or other resilient members, rather than coil springs. One or more pockets may have more than one spring, such as a coil spring with at least cushion such as a foam insert inside, above or below the coil spring or any combination thereof.

Preferably, one dual layered combination of fabric 70 is used to create the string of pocketed springs 26. The dual layered combination of fabric 70 is permeable to airflow through the fabric itself due to the nature of the two layers 72, 74 of the dual layered combination of fabric 70 being permeable to airflow through the fabric, as described herein. Air moves between adjacent fabric pockets 38 and into and out of the string 26 through the dual layered combination of fabric 70.

As is known in the art, dual layered combination of fabric 70 is folded over onto itself around multiple coil springs 40. As best shown in FIG. 2, opposite sides 48, 50 of the dual layered combination of fabric 70 are welded or otherwise secured together in segments to create a longitudinal segmented seam 52 joining four plies, two plies 72, 74 being on each side 48, 50 of the string. Similarly, opposite sides 48, 50 of the dual layered combination of fabric covering opposed surfaces of the springs 40 are welded or otherwise secured together in segments to create a plurality of separating or transverse segmented seams 54, each separating or transverse segmented seam 54 joining four plies, two plies 72, 74 being on each side 48, 50 of the string. FIG. 2 illustrates side 48 being closest to the reader and side 50 being behind the coil springs 40.

As best shown in FIG. 2, opposed edges 56 of the dual layered combination of fabric 70 used to create the string 26 of pocketed springs 28 are aligned and spaced from the longitudinal side seam 52 a distance indicated by numeral 58. Although the drawings indicated the longitudinal seam 52 being below the free edges 56 of the dual layered combination of fabric 70, the longitudinal seam 52 may be above the free edges 56 of the dual layered combination of fabric 70. This is known in the industry as a side seam of a string of springs. As shown in FIG. 2 in dashed lines, edge welds 86 as described below, may be located proximate the longitudinal seam 52. However, in some embodiments, the aligned layers of a dual layered combination of fabric may not be joined together. In other words, no edge welds 36 or other welds are present prior to the dual layered combination of fabric entering a coiler for pocket formation.

As shown in FIG. 2, in the absence of being subjected to a load, the string 26 of pocketed springs 28 has a generally planar top surface 60 in a top plane P1 and a parallel generally planar bottom surface 62 in a bottom plane P2. The linear distance between the top and bottom surfaces of the string 26 of pocketed springs 28 defines a height H of the string 26 of pocketed springs 28. This linear distance further defines the height H of the pocketed spring assembly 12 because each of the strings 26 has the same height. However, it is within the contemplation of the present invention that the strings be different heights.

As best shown in FIG. 2, the longitudinal seam 52 comprises multiple spaced linear weld segments 64 formed using an ultrasonic welding horn and anvil (not shown) as disclosed in U.S. Pat. Nos. 9,943,173 and 9,968,202 which are fully incorporated by reference herein. At least some of the longitudinal seams 52 of a string may not be segmented or be only partially segmented. For example, the longitudinal seam 52 of a string may not be segmented at all.

As best shown in FIG. 2, each transverse or separating seam 54 comprises multiple spaced linear weld segments 66 formed using an ultrasonic welding horn and anvil (not shown) to join the opposed sides 48, 50 of the dual layered combination of fabric 70 as disclosed in U.S. Pat. Nos. 9,943,173 and 9,968,202. Again, at least some of the transverse or separating seams 54 of a string may not be segmented or may be only partially segmented. For example, one or more transverse seams 54 of a string may be partially segmented or not be segmented at all.

Although the weld segments in the embodiments shown are illustrated as being heat-welded spaced rectangular-shaped segments, any of the seam segments may be other shapes, such as spaced dots, ovals or triangles of any desired sizes.

As shown in FIG. 2, the dual or double-layered combination of fabric material 70 of each of the strings 26 is permeable to airflow through the fabric layers. The dual or double-layered combination of fabric 70 comprises two layers, including from the inside of the fabric pocket 38 outwardly as shown in FIG. 2, an inner layer of fabric 74 and an outer layer of fabric 72. More specifically, each layer of fabric 72, 74 may be a non-woven spunbonded polypropylene fabric layer having a weight of approximately one ounce per square yard commercially available from Hanes Industries of Conover, N.C. In one preferred embodiment, each of the layers of non-woven spunbonded polypropylene fabric 72, 74 has a weight of between 0.5 and 1.5 ounces per square yard. The layers 72, 74 may have identical weights or may be slightly different weights. The layers 72, 74 of the dual layered combination of fabric 70 of FIG. 2 are not secured together but are aligned before entering a coiler 102 as shown in FIGS. 6 and 6A. The dual layered combination of fabric 70 of FIG. 2 may have edge seams 86 as shown in dashed lines in FIG. 2 if the dual layered combination or web of fabric is made by the process shown in FIGS. 4-4A or the process shown in FIGS. 5-5A. In the event, the dual layered combination of fabric 70 of FIG. 2 is made by the process shown in FIGS. 6-6A or a similar process, the edge seams 86 will not be present.

These materials and material specifications, such as the weights provided for the fabric layers of the dual layered combination of fabric, have proven to be effective, but are not intended to be limiting. For example, the weight of either of the layers of non-woven spunbonded polypropylene fabric may vary depending upon the desired characteristics of the multi-layered combination of fabric. The cited range of weights is not intended to be limiting.

FIG. 2A illustrates a portion of a string of springs 26' identical to string of springs 26 but made with a dual layered combination of fabric 70', as opposed to the dual layered combination of fabric 70 of string 26. The dual layered combination of fabric 70' may be point bonded, as the term is known in the industry. The bonded or welded locations of the layers of fabric to each other are illustrated by the dots shown in the fabric of FIG. 2A. The dual layered combination of fabric 70' of FIG. 2A further lacks edge seams 86.

Although FIGS. 2 and 2A illustrate a portion of a string of springs 26, 26' used in pocketed spring assembly 12, either of the double-layered non-woven spunbonded polypropylene fabric combinations 70, 70' or any other described herein may be used in any string of spring shown or described herein, such as strings of springs 26a used in pocketed spring assembly 12a.

Figures 4, 4A:
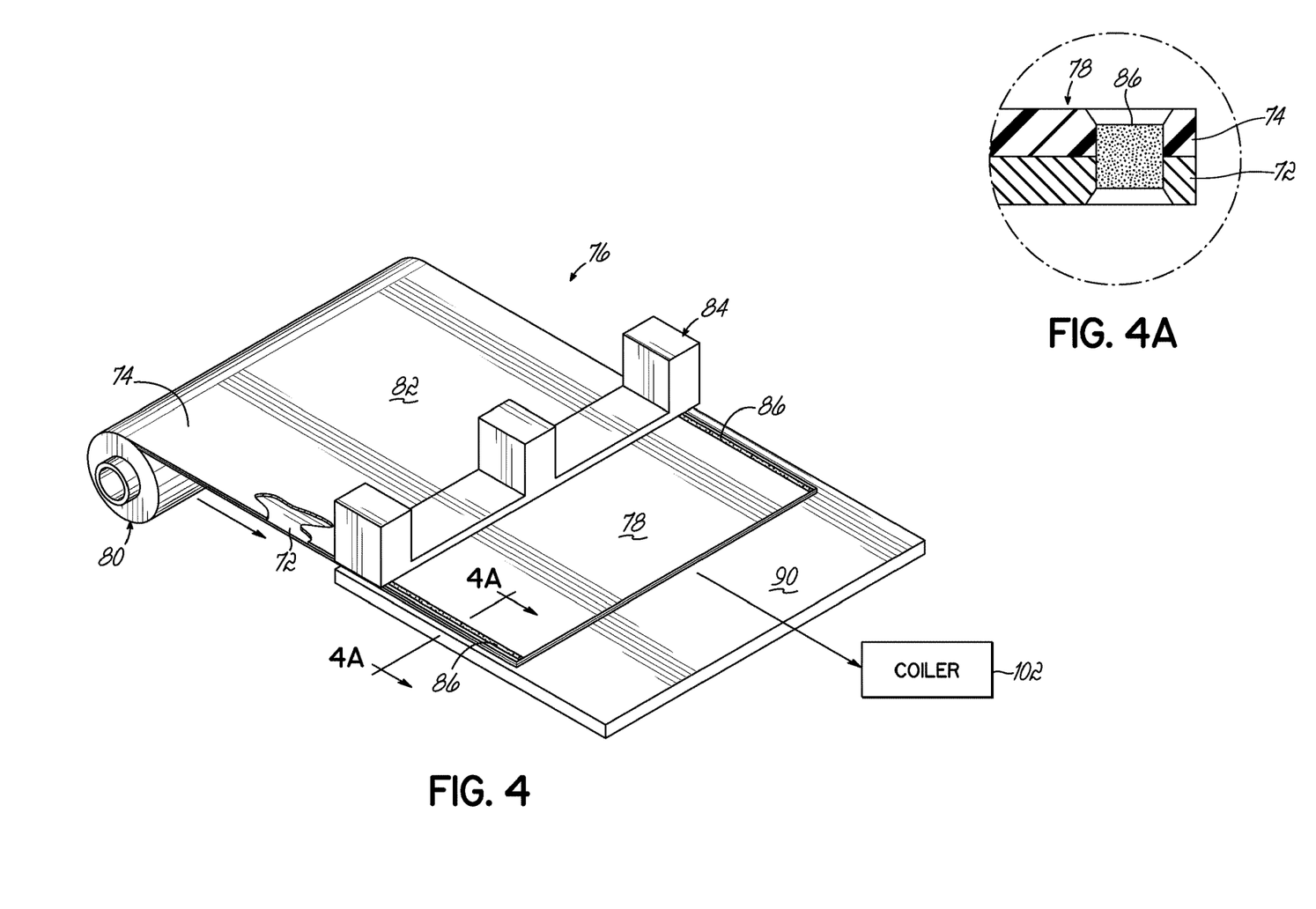
FIG. 4 is a perspective view of an apparatus for ultrasonically welding one of the fabrics of the present invention.
FIG. 4A is a cross-sectional view taken along the line 4A-4A of FIG. 4.

FIGS. 4 and 4A illustrate an apparatus 76 for conducting a method of making a double-layered finished web of non-woven spunbonded polypropylene fabric 78 for use in a coiler to manufacture strings of springs shown and described herein or for any other bedding or seating product including a blanket or comfort layers of pocketed mini coil springs like the spring blanket 30 shown in FIGS. 1B and 1C. The double-layered finished web of non-woven spunbonded polypropylene fabric 78 shown in detail in FIG. 4A comprises a first layer of non-woven spunbonded polypropylene fabric 72 welded to a second layer of non-woven spunbonded polypropylene fabric 74 along two parallel, spaced edge welds 86.

Referring to FIG. 4, the method comprises providing a roll 80 of double-layered non-woven spunbonded polypropylene fabric. A web 82 of the double-layered non-woven spunbonded polypropylene fabric is unrolled from the roll 80 and passed into a welder 84 by a conveyor 90 or any known apparatus for moving the web 82 of the double-layered non-woven spunbonded polypropylene fabric. The web 82 of double-layered non-woven spunbonded polypropylene fabric comprises first and second layers of non-woven spunbonded polypropylene fabric 72, 74 which have not been secured to each other.

The welder 84 creates two edge welds 86 along opposed edges of the moving double-layered non-woven spunbonded polypropylene web 82 of fabric to create a finished double-layered non-woven spunbonded polypropylene web 78 which in which the two layers 72, 74 are welded together along opposed edges of the web by edge welds 86. The finished double-layered non-woven spunbonded polypropylene web 78 is passed onto a coiler 102 in which the finished double-layered non-woven spunbonded polypropylene web 78 is used to manufacture a continuous string of springs for use in the manufacture of pocketed bedding or seating products.

Although each of the edge welds 86 are illustrated as being continuous, non-segmented welds, one or both edge welds 86 may be intermittent rather than continuous. Similarly, one or both edge welds 86 may be segmented rather than solid. Regardless, the edge welds 86 secure the two layers together into a finished double-layered non-woven spunbonded polypropylene web of fabric 78 shown in detail in FIG. 4A.

Figures 5, 5A:
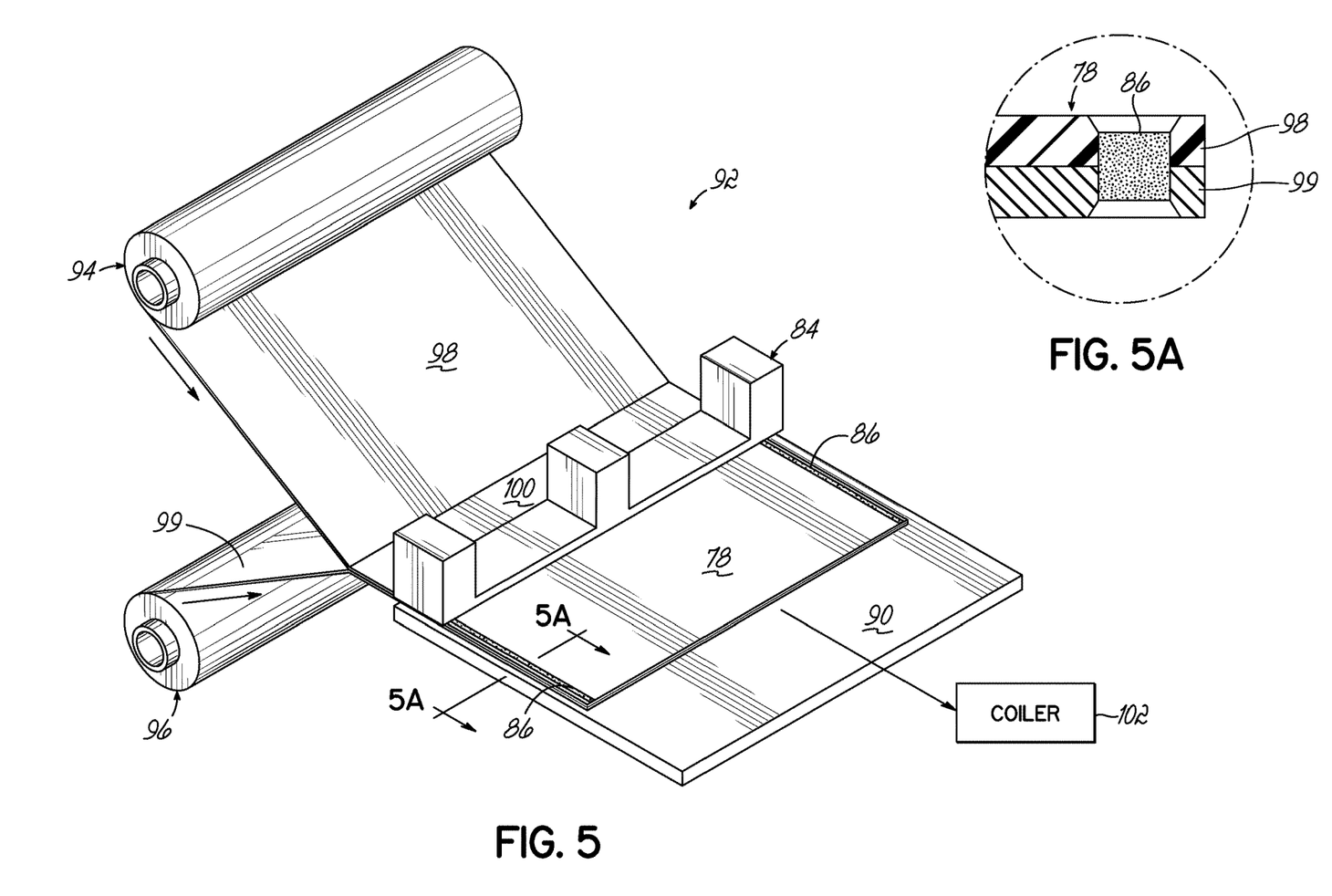
FIG. 5 is a perspective view of another apparatus for ultrasonically welding one of the fabrics of the present invention.
FIG. 5A is a cross-sectional view taken along the line 5A-5A of FIG. 5.
Figures 6, 6A:
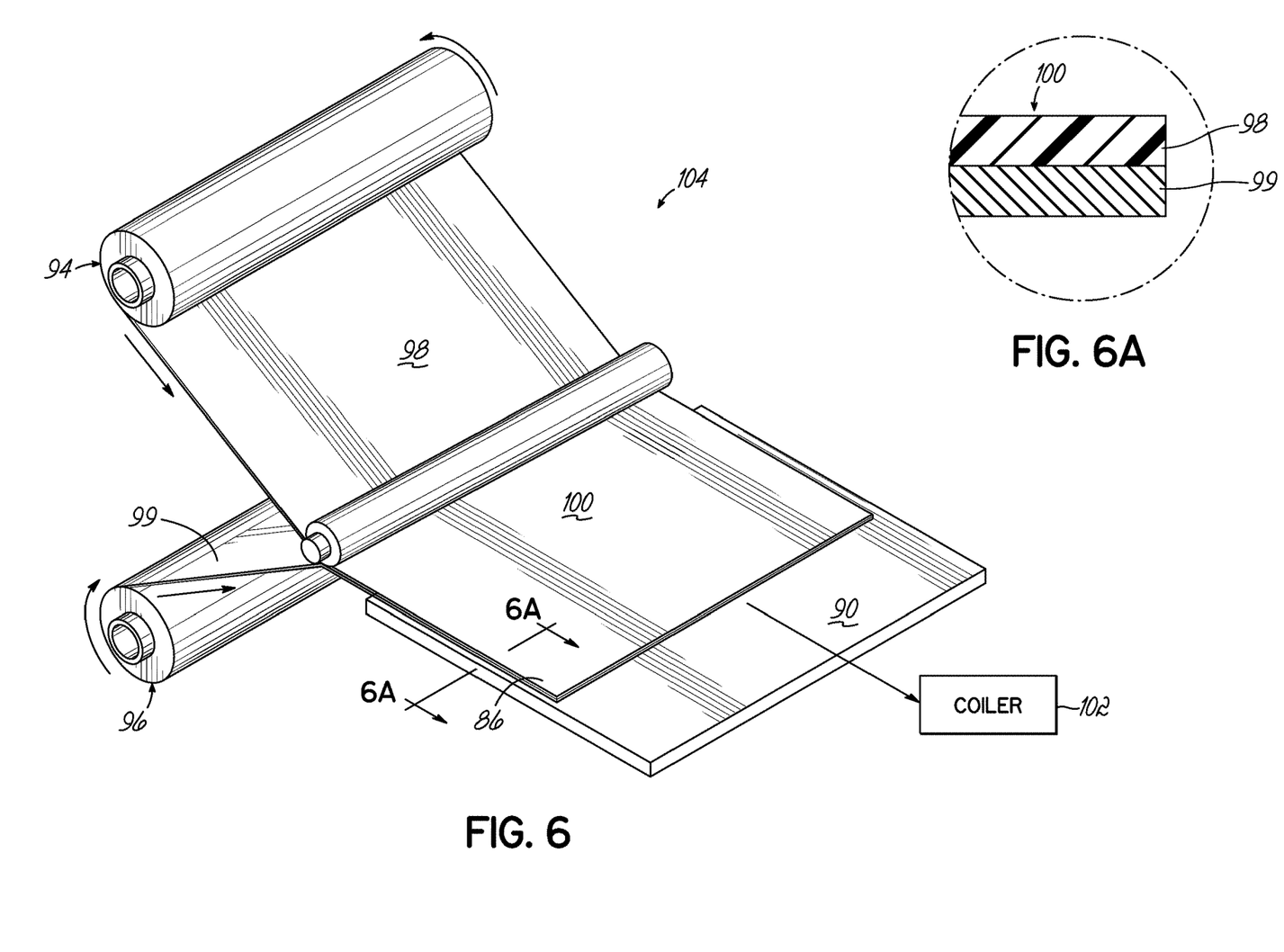
FIG. 6 is a perspective view of an apparatus for aligning two of the layers of the combination and passing the combination into a coiler.
FIG. 6A is a cross-sectional view taken along the line 6A-6A of FIG. 6.

FIGS. 5 and 5A illustrate another apparatus 92 for conducting a method of making a double-layered finished web of non-woven spunbonded polypropylene fabric 78 for use in manufacturing strings of springs shown and described herein or for any other bedding or seating product including a blanket like the spring blanket 30 shown in FIGS. 1B and 1C. The double-layered finished web of non-woven spunbonded polypropylene fabric 78 shown in detail in FIG. 5A is the same double-layered non-woven spunbonded polypropylene fabric 78 shown in detail in FIG. 4A.

Referring to FIG. 5, the method comprises providing two rolls 94, 96 of single-layered non-woven spunbonded polypropylene fabric. Webs 98, 99 of single-layered non-woven spunbonded polypropylene fabric are unrolled from the rolls 94, 96, respectively. The web 98 of single layer non-woven spunbonded polypropylene fabric is placed over the web 99 of single layer non-woven spunbonded polypropylene fabric to create a double-layered non-woven spunbonded polypropylene web 100 of fabric. The double-layered non-woven spunbonded polypropylene web 100 of fabric is passed into a welder 84 by a conveyor 90 or any known apparatus for moving the web 100 of double-layered non-woven spunbonded polypropylene fabric. The web 100 of double-layered non-woven spunbonded polypropylene fabric comprises first and second layers of non-woven spunbonded polypropylene fabric 98, 99 which have not been secured to each other.

The welder 84 creates two edge welds 86 along opposed edges of the moving double-layered non-woven spunbonded polypropylene web 100 of fabric to create a finished double-layered non-woven spunbonded polypropylene web 78 which in which the two layers 72, 74 are welded together along opposed edges of the web by edge welds 86. See FIG. 5A. The finished double-layered non-woven spunbonded polypropylene web 78 is passed onto a coiler 102 in which the finished double-layered non-woven spunbonded polypropylene web 78 is used to manufacture a continuous string of springs for use in the manufacture of pocketed bedding or seating products.

Although each of the edge welds 86 are illustrated as being continuous, non-segmented welds, one or both edge welds 86 may be intermittent rather than continuous. Similarly, one or both edge welds 86 may be segmented rather than solid. Regardless, the edge welds 86 secure the two layers together into a finished double-layered non-woven spunbonded polypropylene web of fabric 78 shown in detail in FIG. 5A.

FIGS. 6 and 6A illustrate another apparatus 104 for conducting a method of making a double-layered finished web or combination of non-woven spunbonded polypropylene fabric 78 for use in manufacturing strings of springs shown and described herein or for any other bedding or seating product including a blanket like the spring blanket 30 shown in FIGS. 1B and 1C. The double-layered finished web of non-woven spunbonded polypropylene fabric 78 shown in detail in FIG. 6A is the same double-layered non-woven spunbonded polypropylene fabric 78 shown in detail in FIG. 4A.

Referring to FIG. 6, the method comprises providing two rolls 94, 96 of single-layered non-woven spunbonded polypropylene fabric. Webs 98, 99 of single-layered non-woven spunbonded polypropylene fabric are unrolled from the rolls 94, 96, respectively, at the same speed. The web 98 of single layer non-woven spunbonded polypropylene fabric is placed over the web 99 of single layer non-woven spunbonded polypropylene fabric to create a double-layered non-woven spunbonded polypropylene web 100 of fabric. The double-layered non-woven spunbonded polypropylene web 100 of fabric is introduced into a coiler 102 by a conveyor 90 or any known apparatus for moving the web 100 of double-layered non-woven spunbonded polypropylene fabric into the coiler 102. The coiler 102 may pull the double-layered non-woven spunbonded polypropylene web 100 into the coiler without any assistance with another apparatus. The web 100 of double-layered non-woven spunbonded polypropylene fabric comprises first and second layers of non-woven spunbonded polypropylene fabric 98, 99 which have not been secured to each other. This method has no welder and the web 100 of double-layered non-woven spunbonded polypropylene fabric has no welds. Inside the coiler 102 the finished double-layered non-woven spunbonded polypropylene web 100 is used to manufacture a continuous string of springs for use in the manufacture of pocketed bedding or seating products.

It is within the contemplation of the present invention that only some of the strings of a pocketed spring assembly be made in accordance with the present invention. For example, every other string may be made of conventional fabric.

It is further within the scope of the present invention that the different strings shown and described herein may be used together.

The various embodiments of the invention shown and described are merely for illustrative purposes only, as the drawings and the description are not intended to restrict or limit in any way the scope of the claims. Those skilled in the art will appreciate various changes, modifications, and improvements which can be made to the invention without departing from the spirit or scope thereof. The invention in its broader aspects is therefore not limited to the specific details and representative apparatus and methods shown and described. Departures may therefore be made from such details without departing from the spirit or scope of the general inventive concept. The invention resides in each individual feature described herein, alone, and in all combinations of those features. Accordingly, the scope of the invention shall be limited only by the following claims and their equivalents.

What is claimed is:

1. A bedding or seating product comprising:
    a pocketed spring assembly comprising a plurality of parallel strings of springs joined together, each of the strings of springs comprising a plurality of individually pocketed springs, each of the strings of springs comprising a dual layered combination of fabric, the dual layered combination of fabric being joined to itself along a longitudinal seam joining four plies, the dual layered combination of fabric having first and second opposed sides covering opposite surfaces of the springs, two plies being on each of the opposed sides, a plurality of pockets being formed along a length of the string of springs by transverse seams joining the first and second sides, at least one spring being positioned in each said pocket, wherein the dual layered combination of fabric comprises only two layers of non-woven fabric;
    cushioning materials; and
    a covering encasing the pocketed spring assembly and cushioning materials.

2. A pocketed spring assembly for use in a bedding or seating product, the pocketed spring assembly comprising:
    a pocketed spring assembly comprising a plurality of parallel strings of springs joined together, each of the strings of springs comprising a plurality of individually pocketed springs, each of the strings of springs comprising a dual layered combination of fabric, the dual layered combination of fabric being joined to itself along a longitudinal seam joining four plies, the dual layered combination of fabric having first and second opposed sides covering opposite surfaces of the springs, two plies being on each of the opposed sides, a plurality of pockets being formed along a length of the string of springs by transverse seams joining the first and second sides, at least one spring being positioned in each said pocket, wherein the dual layered combination of fabric comprises only two layers of non-woven fabric.

3. The pocketed spring assembly of claim 2 wherein the two layers of non-woven fabric are identical.

4. The pocketed spring assembly of claim 2 wherein at least one of the layers comprises non-woven spunbonded polypropylene fabric.

5. The pocketed spring assembly of claim 2 wherein the layers of non-woven fabric are joined together at multiple locations.

6. The pocketed spring assembly of claim 2 wherein the layers of non-woven fabric are ultrasonically welded together at multiple locations.

7. The pocketed spring assembly of claim 2 wherein each of the layers of non-woven fabric has a weight of 0.5 to 1.5 ounces per square yard.

8. The pocketed spring assembly of claim 2 wherein each of the layers of non-woven fabric has the same weight.

9. The pocketed spring assembly of claim 2 wherein the layers of non-woven fabric have different weights.

10. A pocketed spring assembly for use in a bedding or seating product, the pocketed spring assembly comprising:
    a plurality of parallel strings of springs joined together, each of said strings comprising a plurality of individually pocketed springs, each of the strings being formed from a set of aligned non-woven spunbonded polypropylene fabric pieces, said aligned set of fabric pieces being joined to itself along a longitudinal seam joining four plies and having first and second opposed sides of fabric covering opposite surfaces of the springs, two plies being on each of the first and second opposed sides, a plurality of pockets being formed along a length of the string by transverse seams joining the first and second sides of the fabric, at least one spring being positioned in each of the pockets, wherein the longitudinal seam and each of the transverse seams joins four pieces of fabric together.

11. The pocketed spring assembly of claim 10 wherein the set comprises two pieces of non-woven spunbonded polypropylene fabric ultrasonically welded together along opposed side edges of the pieces of fabric.

12. The pocketed spring assembly of claim 11 wherein the two pieces of non-woven spunbonded polypropylene fabric are identical.

13. The pocketed spring assembly of claim 10 wherein each of the pieces of non-woven spunbonded polypropylene fabric has a weight of 0.5 to 1.5 ounces per square yard.

14. The pocketed spring assembly of claim 11 wherein the two pieces of non-woven spunbonded polypropylene fabric are ultrasonically welded together only along opposed side edges of the pieces of fabric.

15. The pocketed spring assembly of claim 10 wherein at least one of the pieces of non-woven spunbonded polypropylene fabric has a weight of 0.5 to 1.5 ounces per square yard.

16. The pocketed spring assembly of claim 10 wherein each of the pieces of non-woven spunbonded polypropylene fabric has the same weight.

17. The pocketed spring assembly of claim 10 wherein the pieces of non- woven spunbonded polypropylene fabric have different weights.

18. A method of making a fabric for use in a pocketed spring assembly, said method comprising:
creating a web of double-layered non-woven spunbonded polypropylene fabric from two rolls of single-layered non-woven spunbonded polypropylene fabric;
passing the web of double-layered non-woven spunbonded polypropylene fabric through an apparatus to create a finished non-woven spunbonded polypropylene fabric; and
using the finished non-woven spunbonded polypropylene fabric to create a string of springs, the string having at least one seam joining four plies of fabric and having two plies on each of opposite sides of the string of springs.

19. The method of claim 18 wherein the finished non-woven spunbonded polypropylene fabric is point bonded.

20. The method of claim 18 wherein the apparatus creates welds along edges of the web of double-layered non-woven spunbonded polypropylene fabric.

21. The method of claim 18 wherein the apparatus creates continuous welds along edges of the web of double-layered non-woven spunbonded polypropylene fabric.

22. A string of springs for use in a pocketed spring assembly, the string of springs comprising:
a plurality of individually pocketed springs, said string of springs comprising a dual layered combination of fabric joined to itself along a longitudinal seam joining four plies of the dual layered combination of fabric, first and second opposed sides of the dual layered combination of fabric being on opposite sides of the springs, two plies being on each of the opposed sides of the springs, a plurality of pockets being formed along a length of the string by transverse seams joining four plies of the dual layered combination of fabric, at least one spring being positioned in each of the pockets, wherein the dual layered combination of fabric comprises two layers of non-woven spunbonded polypropylene fabric.

23. The string of springs of claim 22 wherein the two layers are ultrasonically welded together.

24. The string of springs of claim 22 wherein the two layers are made of the same fabric.

25. A method of making a fabric for use in a pocketed spring assembly, said method comprising:
unrolling a web of double-layered fabric from a roll of double-layered fabric, each of the layers comprising non-woven spunbonded polypropylene fabric;
passing the web of double-layered fabric through a welder to create a finished fabric;
creating a string of springs with the finished fabric, the string having a longitudinal seam and transverse seams, each of the seams joining four plies of fabric and the finished fabric having two plies on each of opposite sides of the string of springs.

26. The method of claim 25 wherein the welder creates continuous welds along edges of the web of double-layered fabric.

27. A comfort layer for a bedding or seating cushion product, said comfort layer comprising:
a matrix of interconnected pocketed springs, each spring of which is contained within a pocket of non-woven fabric between top and bottom plies, each of the plies of non-woven fabric being permeable to airflow through the non-woven fabric ply, the non-woven plies being joined by a seam around the pocket, wherein at least one of the plies comprises double-layered non-woven fabric.

28. The comfort layer of claim 27 wherein each layer of at least one of the plies comprises non-woven spunbonded polypropylene fabric.

29. The comfort layer of claim 27 wherein the seams of the pockets are circular.

30. The comfort layer of claim 27 wherein the seams of the pockets are straight.

* * * * *